G. M. EATON.
RESILIENT GEAR WHEEL.
APPLICATION FILED FEB. 7, 1916.

1,279,999.

Patented Sept. 24, 1918.
2 SHEETS—SHEET 1.

WITNESSES:
A. J. Fitzgerald
W. B. Wells

INVENTOR
George M. Eaton.
BY
Wesley G. Carr
ATTORNEY

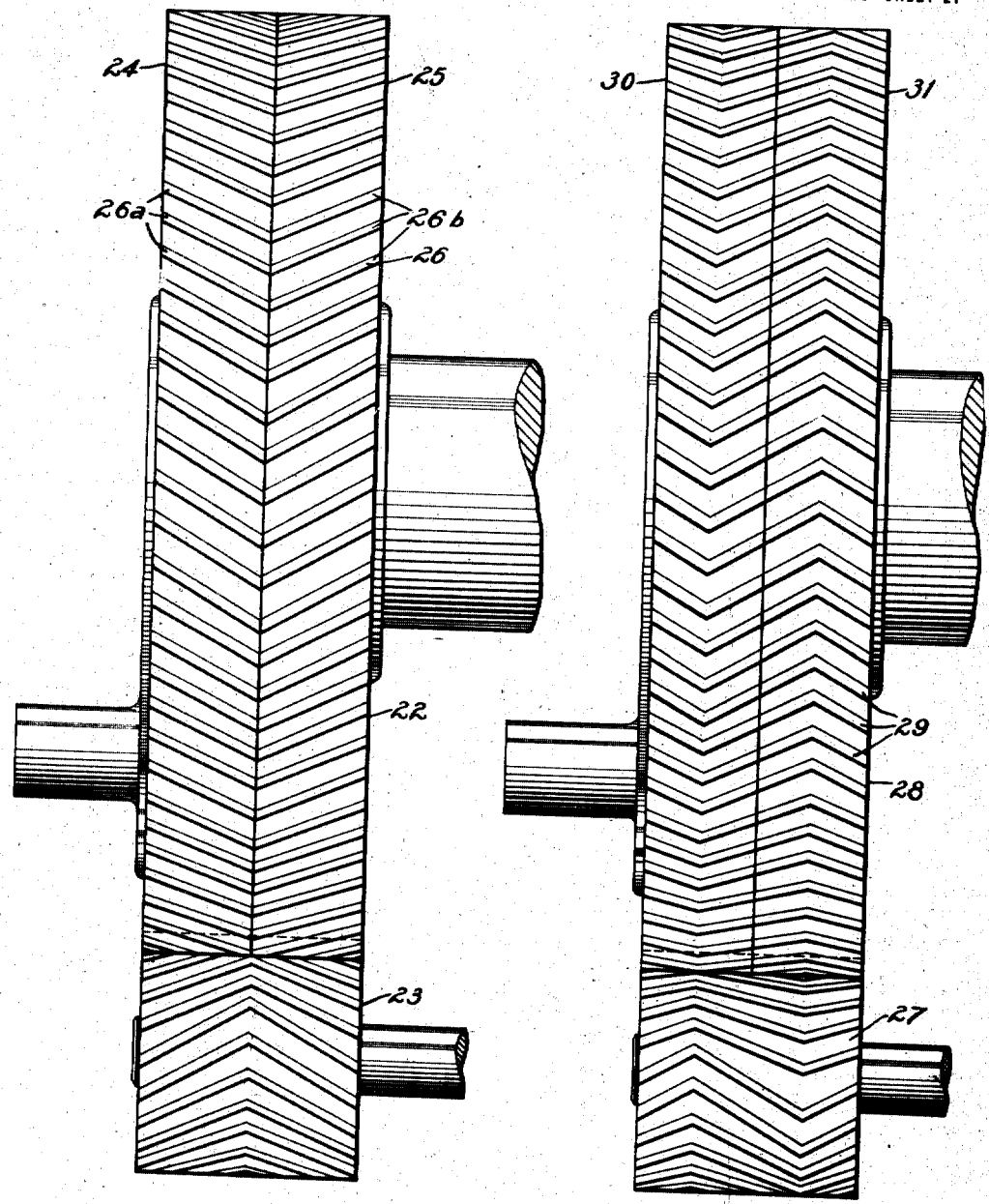

UNITED STATES PATENT OFFICE.

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

RESILIENT GEAR-WHEEL.

1,279,999. Specification of Letters Patent. Patented Sept. 24, 1918.

Application filed February 7, 1916. Serial No. 76,601.

*To all whom it may concern:*

Be it known that I, GEORGE M. EATON, a citizen of the United States, and a resident of Pittsburgh, in the county of Allegheny and State of Pennsylvania, have invented a new and useful Improvement in Resilient Gear-Wheels, of which the following is a specification.

My invention relates to resilient gear wheels and particularly to such means as are interposed between the driving wheels of railway vehicles and the rotatable members of the propelling units.

One object of my invention is to provide a gear wheel of the above indicated character which shall be simple and compact in construction and embody relatively few parts which may be conveniently assembled and disassembled.

Another object of my invention is to provide a gear wheel of the above indicated character that shall have the teeth thereof divided into separate portions and mounted on different members of the gear wheel so that each gear tooth may have contact with the enmeshing gear at at least two points.

More specifically, the object of my invention is to provide a gear wheel embodying a hub member, a compound rim consisting of a plurality of rim members and resilient means for joining the individual rim members to the hub member, the rim members and the hub member being adapted to rigidly engage each other after a limited relative rotational movement therebetween.

Figure 2:
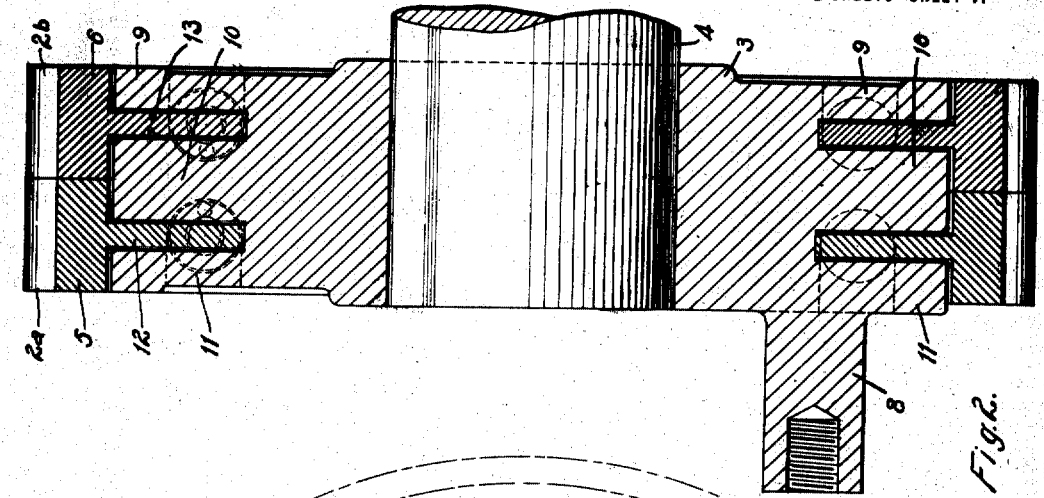
Figure 1:
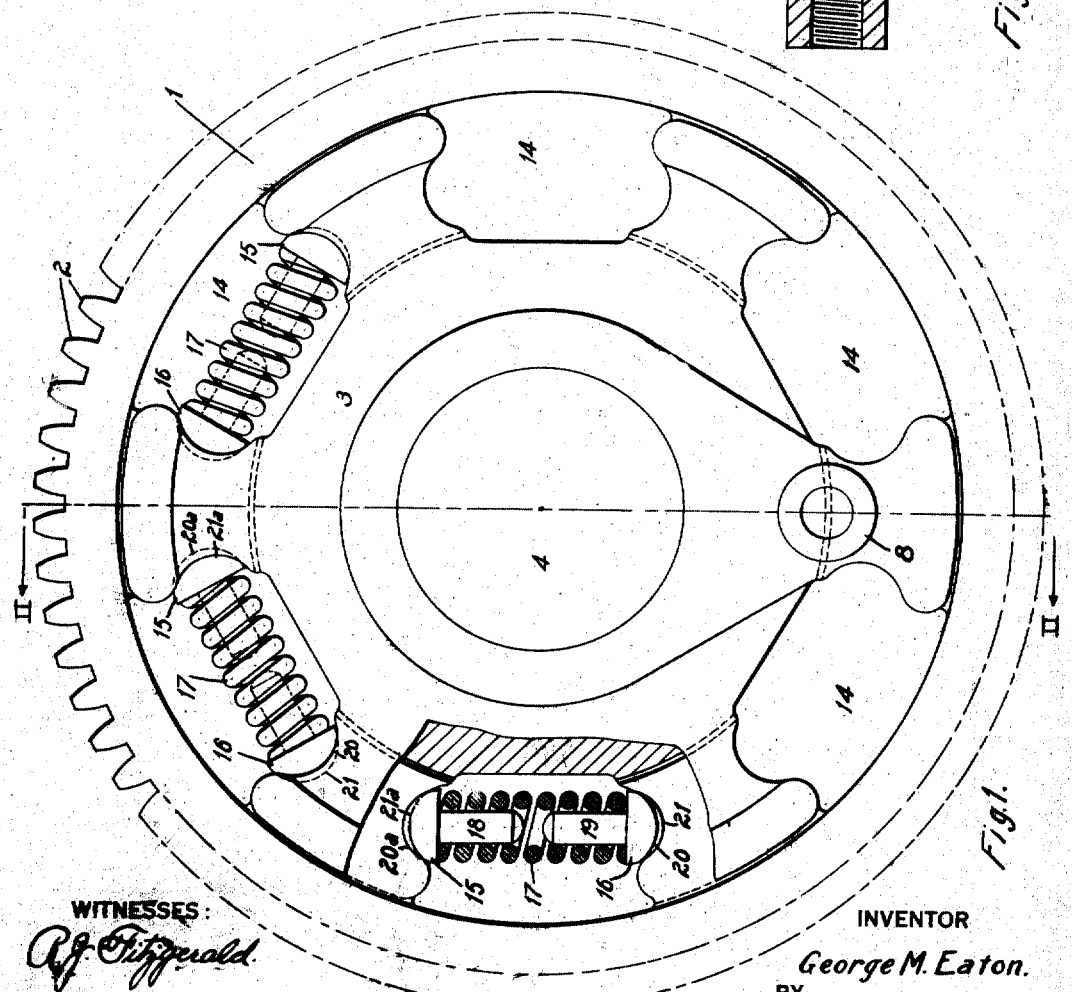

In the accompanying drawing illustrating my invention, Figure 1 is a side elevation, partly in section, of a gear wheel constructed in accordance with my invention; Fig. 2 is a section along the line II—II of Fig. 1, and Figs. 3 and 4 are views of a pinion and gear wheel constructed in accordance with my invention and provided with herring-bone and citroen teeth, respectively.

Referring to Figs. 1 and 2 of the drawing, a gear wheel 1 is shown embodying gear teeth 2, a hub member 3 mounted upon a shaft 4, rim members 5 and 6, and resilient connectors 7. The hub member 3 is provided with a laterally projecting crank pin 8 and radial projections 9, 10 and 11. The crank pin 8 may be integral with the hub member 3, as shown, or it may be an independent pin attached to the hub member in any manner well known in the art. The rim member 5 is provided with portions $2^a$ of the gear teeth 2 and inward radial projections 12 which are disposed between, and register with the hub projections 10 and 11. The rim member 6 is provided with portions $2^b$ of the gear teeth 2 and inward radial projections 13 which are disposed between and register with the hub projections 9 and 10.

With the rim projections 12 and 13 registering with the hub projections 9, 10 and 11, apertures 14 are formed, in which the connectors 7 are disposed, one connector being placed in each aperture for each rim member.

The connectors 7 are similar to the connectors disclosed in my application for a patent on a resilient gear, Serial No. 58,166, filed October 27, 1915. Each of the connectors embodies two retaining members 15 and 16 and a coil spring 17 disposed thereon. The retaining members 15 and 16 are provided with shanks 18 and 19 for supporting the springs 17 and with cylindrically curved surfaces 20, 21, $20^a$ and $21^a$ for preventing them from having movement radially or laterally with respect to the hub and rim members. Each of the cylindrically curved surfaces 21 should have a width equal to that of each of the rim projections 12 and 13 and be adapted to extend between the projections 10 and 11 or the projections 9 and 10 into engagement with the projections 12 or the projections 13. Each retaining member 15 is provided with two cylindrically curved surfaces $20^a$ which are adapted to engage the projections 9 and 10 or the projections 10 and 11 of the hub member and a cylindrical surface $21^a$ which is adapted to engage projections 12 and 13 of the rim members 5 and 6.

The cylindrical surfaces 21 on the retaining members 16 are raised above the cylindrical surfaces 20, and the cylindrical surfaces $20^a$ on the retaining member 15 are raised above the cylindrical surface $21^a$, whereby the retaining members 7 are prevented from having any lateral movement relative to the gear wheel, when in operative position, since the projections 12 and 13 on the rim members engage the cylindrical surfaces $21^a$ between the cylindrical surfaces $20^a$ on one end of the connectors and the cylindrical surface 21 on the other end of the connectors engage the projections 12 and 13 and are disposed between the hub projections 9, 10 and 11.

The rim projections 12 and 13 are provided with cylindrically curved seats which are adapted to engage the cylindrically curved surfaces 21 and 21ᵃ of the connectors. The cylindrically curved surfaces 20 and 20ᵃ of the connectors are adapted to engage similar cylindrically curved surfaces on the hub member 3.

Referring to Fig. 3 of the drawing, a gear wheel 22, constructed in accordance with my invention, is shown enmeshing with a pinion 23. The gear wheel is provided with rim members 24 and 25 and herring-bone or double-helical teeth 26. Each of the teeth 26 has a portion 26ᵃ mounted upon the rim member 24 and a portion 26ᵇ mounted upon the rim member 25. The pinion 23 is shown with a unitary rim member but may be constructed with a divisible rim, if so desired.

In many cases, it is desirable to have enmeshing gear wheels and pinions provided with citroen teeth, but trouble is experienced with this type of teeth in case the teeth fail to mesh properly. The failure of the gear wheels and pinions to mesh properly, when provided with citroen teeth, may be due to faulty assembling of the gear wheel or the pinion upon its shaft or improper location of the shafts themselves and to defects in the teeth themselves.

However, gear wheels provided with citroen teeth and constructed in accordance with my invention may be combined with a pinion having citroen teeth without experiencing the difficulties above set forth.

Referring to Fig. 4, a pinion 27 provided with citroen teeth is shown enmeshing with a gear wheel 28 having citroen teeth 29. The rim of the gear wheel 27 is constructed in two parts 30 and 31 so as to divide each citroen tooth into two equal portions.

In assembling the gear illustrated in Figs. 1 and 2, the rim members 5 and 6 are placed on the hub member 3, with the projections 12 and 13 disposed between the projections 10 and 11 and the projections 9 and 10, respectively. The hub and rim projections should be of the same length in order that they properly interlock with the connectors 7. The connectors 7 are inserted in the apertures 14, with the cylindrically curved surfaces 21 and 21ᵃ in engagement with the rim projections 12 and 13 and the cylindrically curved surfaces 20 and 20ᵃ in engagement with the hub projections 9, 10 and 11.

In operating the gear wheel, the rim members 5 and 6 may have relative movement as to each other and as to the hub member 3. However, after a limited rotational movement of either of the rim members 5 and 6 relative to the hub member 3, the shanks 18 and 19 of the connectors will engage each other and establish a rigid connection between the hub and the rim member.

It is evident that modifications in the specific structural details may be effected without departing from the spirit and scope of my invention, and I desire that only such limitations shall be imposed as are indicated in the appended claims.

I claim as my invention:

1. A resilient wheel comprising a hub and a plurality of rim members surrounding the same, and means for resiliently and severally connecting said rim members to the hub member to permit relative movement between the rim members, severally, and between the rim members and the hub member.

2. In a gear wheel, the combination with a hub member having a plurality of radial projections, and a plurality of rim members having integral radial projections extending therefrom, of means for resiliently joining said projections and for permitting relative rotative movement between said rim members.

3. In a resilient gear wheel, the combination with a hub member, and a plurality of rim members surrounding said hub member, of resilient means for severally joining said rim members to the hub member.

4. A resilient wheel comprising a hub, a crank pin carried by, and extending laterally from, the hub, a plurality of rim members surrounding the hub, and means for resiliently and severally connecting said rim members to the hub member to permit relative movement between the rim members, severally, and between the rim members and the hub member.

5. A resilient gear wheel comprising a hub, a plurality of rim members surrounding the same, each of the rim members being provided with peripheral gear teeth, and means for resiliently and severally connecting said rim members to the hub member to permit relative movement between the rim members, severally, and between the rim members and the hub member, whereby errors in the form of the teeth of said rim members may be compensated for to insure full working contact of each complete tooth of the gear wheel with the coöperating teeth of a mating gear.

6. In a resilient gear wheel, the combination with a hub member and a plurality of rim members, of means for permitting restrained movement of the individual rim member relative to said hub member and means for rigidly joining any of the rim members to the hub member after a limited relative rotation therebetween.

7. In a resilient gear wheel, the combination with a hub member having radial projections and a crank pin extending laterally therefrom, and a plurality of rim members surrounding said hub member, of resilient means for joining said hub and rim members.

8. A resilient gear wheel comprising a hub, a plurality of members surrounding the same, each of the rim members being provided with peripheral gear teeth of helical form, and means for resiliently and severally connecting said rim members to the hub member to permit relative movement between the rim members, severally, and between the rim members and the hub member, whereby errors in the form of the teeth of said rim members may be compensated for to insure full working contact of each complete tooth of the gear wheel with the coöperating teeth of a mating gear.

9. In a resilient gear wheel, the combination with a hub member and a plurality of rim members surrounding said hub member, of resilient means for severally joining said rim members to said hub member whereby the individual rim members and the hub member may have limited rotational movement relative to each other.

10. In a resilient gear wheel, the combination with a plurality of rim members having integral radial projections, and a hub member disposed within said rim members and having laterally-spaced radial projections coöperating with said rim projections to form apertures through the gear wheel between the hub and rim members, of means inserted in the apertures for resiliently and severally joining said rim members to said hub member, said means being restrained from lateral movement by said hub and rim members.

11. In a resilient gear wheel, the combination with a hub member having radial projections extending therefrom, and two rim members surrounding said hub member and having radial projections which register with said hub projections, of a plurality of spring connectors for severally joining the rim members to said hub member.

12. A gear wheel comprising a hub member having radial projections extending therefrom, a plurality of rim members having integral radial projections which register with said hub projections, means for resiliently joining said members, and citroen teeth formed on said rim members.

13. The combination with a pinion having a single series of integral citroen teeth, of a gear wheel enmeshing said pinion and provided with teeth divided into portions which may have limited rotative movement relative to one another.

14. The combination with a gear wheel comprising a hub member and rim members resiliently joined to said hub member and provided with citroen teeth, of a pinion having single series of citroen teeth enmeshing with said rim members.

15. The combination with a resilient gear wheel having citroen teeth thereon and embodying a hub member and rim members, and a pinion having a single series of teeth enmeshing with said gear wheel, of means for insuring more than one point of contact between each pair of meshing teeth on the said gear wheel and said pinion.

In testimony whereof, I have hereunto subscribed my name this 28th day of January, 1916.

GEORGE M. EATON.